United States Patent Office 2,766,222
Patented Oct. 9, 1956

2,766,222

SYNTHETIC PLASTICS FROM META-XYLYLENE DIAMINE AND ISOPHTHALIC ACID

Funston G. Lum and Earl F. Carlston, Richmond, and Judson C. Butler, El Cerrito, Calif., assignors to California Research Corporation, San Francisco, Calif., a corporation of Delaware No Drawing. Application June 4, 1953,
Serial No. 359,633

4 Claims. (Cl. 260—78)

This invention relates to new and useful synthetic plastics. More particularly, the invention concerns novel superpolyamides which are superior thermoplastic molding materials.

High molecular weight superpolyamides having molecular weights of at least 10,000 are generally known to the synthetic plastics art. Nylons or superpolyamides obtained from the condensation of diamines with dicarboxylic acids are probably the best known materials of this type.

As thermoplastic resins, the nylons are generally satisfactory in their resistance to heat and chemicals as well as their high tensile and impact strengths and other desirable properties. Unfortunately, however, they are inherently opaque or translucent.

We have now discovered a novel class of clear thermoplastic superpolyamides of meta-xylylene diamine and isophthalic acid and mixtures of isophthalic acid and terephthalic acid. These superpolyamides are characterized by recurring units of the structural formula:

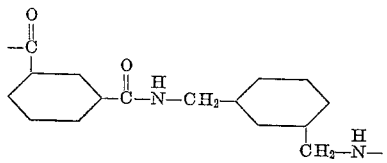

The clear thermoplastic superpolyamides of the invention may also be described as meta-xylylene isophthalamide superpolymers.

These novel superpolyamides are completely transparent in their natural state and are highly suitable for the production of molded articles, and the like, where clear plastic materials are desired. They are also unusually resistant to heat and chemicals and possess excellent tensile and impact strengths.

The novel meta-xylylene isophthalamide superpolymers of the invention are prepared essentially by condensing meta-xylylene diamine and isophthalic acid to produce a high polymer. The condensation may be effected by heating the diamine and the acid in a reaction vessel from which the water formed in the reaction is removed by distillation or other suitable means. For present purposes a three-step procedure is preferred involving (1) formation of an aqueous nylon salt, (2) separation of the salt or heating of the water and salt to evaporate the water and form a low polymer, and (3) polymerization of the salt, or further polymerization of the low polymer to a high polymer.

The nylon salt of meta-xylylene diamine and isophthalic acid according to the invention may be prepared by neutralizing the meta-xylylene diamine with the isophthalic acid in water to form an aqueous nylon salt solution. Approximately equimolecular proportions of isophthalic acid and meta-xylylene diamine are employed.

The nylon salts formed in the above reaction may be precipitated and separated by several means. A lower molecular weight alcohol such as isopropanol may be added to precipitate the salt or the solution may be cooled. The precipitated nylon salts may be separated by any suitable means for separating solids and liquids such as filtration, centrifuging, etc.

According to another method the aqueous nylon salt solution may be heated at atmospheric pressure to remove the water and at the same time form an initial low polymer. This method is preferred in practice since it avoids the use of separation equipment and facilitates the handling of materials by keeping them in liquid form.

The polymerization of the nylon salt of meta-xylylene diamine and isophthalic acid pursuant to the invention is effected by heating the salt to the temperature at which condensation occurs to form a highly polymeric product. An inert atmosphere such as nitrogen gas is desirable in this operation. After the initial formation of a low polymer the polymerization is most conveniently continued by heating at reduced pressures of 40 millimeters of mercury or less. Temperatures in the range of 240 to 280° C. and pressures of 0.01 to 0.1 millimeter mercury are preferred.

The meta-xylylene diamine may be derived from several sources. For present purposes it is very conveniently and economically prepared from isophthalonitrile by hydrogenation.

The isophthalic acid is easily obtainable. Isophthalic acid prepared by the oxidation of meta-xylene, in particular, is readily available and economical to use.

In accordance with another embodiment of the present invention, up to 40 mole percent and more particularly from 10 to 30 mole percent of isophthalic acid in the meta-xylene isophthalamide superpolymer may be substituted by terephthalic acid. Such mixtures of isophthalic acid and terephthalic acid may be obtained by oxidation of mixed meta-xylene and paraxylene fractions which are readily and economically available. Larger proportions of terephthalic acid than those specified are undesirable, since the superpolymers from such mixtures are characterized by an opacity which renders them unsuitable for molding operations, and the like, in which clear thermoplastics are desired.

The aforementioned mixed superpolyamides of meta-xylylene diamine and mixtures of isophthalic acid and terephthalic acid are equivalent to the pure meta-xylylene isophthalamide superpolymers. They possess the same transparency, high melting points and high heat distortion points. This is quite remarkable. Ordinarily, mixtures of dibasic acids when used in the preparation of supercondensation polymers result in products characterized by melting points and heat distortion points considerably lower than those of the corresponding polymers with either of the acids in a pure state.

The following examples of the invention are offered for the purpose of illustration, but are not to be considered in limitation thereof. The proportions given are on a weight basis unless otherwise specified.

*Example 1*

An aqueous nylon salt solution was prepared by adding 16.6 parts by weight of isophthalic acid to a mixture of 13.6 parts of meta-xylylene diamine and 140 parts of water. 393 parts by weight of isopropanol were added to this solution to precipitate the nylon salt. The salt was then separated by filtration. 25 parts of wet nylon salt were recovered in this operation and were charged to a glass reaction flask. The salt was polymerized when heated slowly under an inert atmosphere of nitrogen to 260° C. and maintained at this temperature for 4 hours to form a low polymer. When the polymerization was continued for an additional hour at 0.01 to 0.1 mm. pressure, a very viscous, highly polymeric meta-xylylene isophthalamide was formed having a molecular weight of over 10,000.

The meta-xylylene isophthalamide superpolymer upon cooling was completely transparent. It possessed a high softening point of about 150 to 170° C. and did not become sticky to metal until approximately 210–215° C.

*Example 2*

1.66 parts by weight of terephthalic acid and 12 parts by weight of water were added to 4.08 parts by weight of meta-xylylene diamine. These materials were heated under an atmosphere of nitrogen to facilitate neutralization of the terephthalic acid. Following this, 3.32 parts by weight of isophthalic acid were added. The water was distilled off, the dry salt thus obtained was then heated under an inert atmosphere of nitrogen to 260–275° C. for a period of about 4 hours to form a low polymer. A vacuum of 0.01 to 0.1 mm. pressure was then applied and the heating was continued for an hour to produce the high polymer of meta-xylylene diamine and isophthalic-terephthalic acid.

The product, consisting of a meta-xylylene isophthalamide superpolymer in which 33 mole per cent of the isophthalic acid was substituted by terephthalic acid, was completely transparent when cooled. It was found to have a softening point of 150–170° C. and a stick point of approximately 210–215° C. which were identical with the physical characteristics of the meta-xylylene isophthalamide superpolymer in Example 1 above.

We claim:

1. A clear thermoplastic meta-xylylene diamine isophthalamide superhomopolyamide.

2. A method of preparing clear thermoplastic superpolymers of meta-xylylene diamine and isophthalic acid which comprises condensing equimolecular proportions of a mixture consisting of meta-xylylene diamine and isophthalic acid to a high polymer.

3. A method of preparing a clear thermoplastic superhomopolymer of meta-xylylene diamine and isophthalic acid which comprises neutralizing an aqueous solution of the meta-xylylene diamine with isophthalic acid, separating the salt thus formed and heating it at a reduced pressure to form the said homopolymer.

4. A clear thermoplastic superpolyamide of meta-xylylene diamine, as the sole amine, and of an acid consisting of an acid selected from the group consisting of isophthalic acid and mixtures of isophthalic and terephthalic acid containing up to about 40 mole percent terephthalic acid based on the total acid.

References Cited in the file of this patent

UNITED STATES PATENTS

| | | |
|---|---|---|
| 2,130,523 | Carothers | Sept. 20, 1938 |
| 2,244,192 | Flory | June 3, 1941 |
| 2,252,554 | Carothers | Aug. 12, 1941 |
| 2,277,125 | Martin | Mar. 24, 1942 |
| 2,516,585 | Pease | July 25, 1950 |
| 2,640,080 | De Tar et al. | May 26, 1953 |

OTHER REFERENCES

Ruggli et al.: Helvetica Chimica Acta, vol. 30, 1947, pages 1845, 1848, 1849.